US012157867B2

(12) United States Patent
Bernoud

(10) Patent No.: US 12,157,867 B2
(45) Date of Patent: Dec. 3, 2024

(54) COMPOSITION FOR CANDLE

(71) Applicant: BIOSYNTHIS, Saint Cyr sous Dourdan (FR)

(72) Inventor: Thierry Bernoud, Saint Cyr sous Dourdan (FR)

(73) Assignee: BIOSYNTHIS, Dourdan (FR)

( * ) Notice: Subject to any disclaimer, the term of this patent is extended or adjusted under 35 U.S.C. 154(b) by 0 days.

(21) Appl. No.: 18/019,670

(22) PCT Filed: Aug. 3, 2021

(86) PCT No.: PCT/EP2021/071684
§ 371 (c)(1),
(2) Date: Aug. 18, 2023

(87) PCT Pub. No.: WO2022/029133
PCT Pub. Date: Feb. 10, 2022

(65) Prior Publication Data
US 2024/0301321 A1 Sep. 12, 2024

(30) Foreign Application Priority Data
Aug. 3, 2020 (FR) ...................................... 20/08255

(51) Int. Cl.
*C11C 5/00* (2006.01)

(52) U.S. Cl.
CPC .................................... *C11C 5/002* (2013.01)

(58) Field of Classification Search
CPC .................................. C11C 5/002; C11C 5/00
USPC ............................................................ 44/275
See application file for complete search history.

(56) References Cited

U.S. PATENT DOCUMENTS 7,588,607 B1 * 9/2009 Cap ......................... C11C 5/002 44/275
7,846,372 B1 12/2010 Njus et al.
2003/0017431 A1 * 1/2003 Murphy .................. C11C 5/002 44/275
2003/0046860 A1 3/2003 Tiffany et al.
2004/0088908 A1 * 5/2004 Murphy .................. C11C 5/002 44/275
2010/0205851 A1 * 8/2010 Uptain .................... C11C 5/008 44/275
2010/0212214 A1 8/2010 Wu et al.
2012/0015312 A1 * 1/2012 Kodali .................... C11C 5/002 44/275
2016/0281030 A1 * 9/2016 Grimm ................... C11C 5/002
2016/0348031 A1 * 12/2016 Cen ......................... C11C 5/002

FOREIGN PATENT DOCUMENTS

| | | | |
|---|---|---|---|
| CA | 2 655 367 | A1 | 8/2010 |
| DE | 10 2007 056 171 | A1 | 5/2009 |
| FR | 3 021 217 | A1 | 11/2015 |
| JP | 2003-206494 | A | 7/2003 |
| KR | 10-1839237 | B1 | 4/2018 |
| WO | 2008/115604 | A1 | 9/2008 |

OTHER PUBLICATIONS

Mar. 22, 2021 Search Report issued in French Patent Application No. 2008255.
Mar. 22, 2021 Written Opinion issued in French Patent Application No. 2008255.
Nov. 12, 2021 International Search Report issued in International Patent Application No. PCT/EP2021/071684.
Nov. 12, 2021 Written Opinion issued in International Patent Application No. PCT/EP2021/071684.
Sep. 19, 2022, International Preliminary Report on Patentability issued in International Patent Application No. PCT/EP2021/071684.
Cargill EMEA, Product Data Sheet, NatureWax 660-52 IN 20 KG Cartons, 2020, pp. 1-2.
Cargill EMEA, Product Data Sheet, NatureWax 660, 2020, pp. 1-2.
Cargill, Technical Data Sheet, NatureWax C-3, 2017, pp. 1-2.
Societe Industrielle des Oleagineux, Specification Data Sheet, VGB 6, 2017, pp. 1-4.
Sasol, Sales Specification, NAFOL 1822 NAFOL 1822 B NAFOL 1822 C, p. 15.
Sasol, NAFOL 1822 C, 2008, ver. 1.1.
TUV, Testing Candle Wax Products and Accessories, pp. 1-3.
Cargill EMEA, Product Data Sheet, NatureWax 27-80 / SG, 2020, pp. 1-2.
RAL, Extract from the Specific Quality Assurance and Test Specifications for Candles Indoors RAL-GZ 041/2, 2020, pp. 1-8.
RAL Quality Mark Candles, Candles, Quality Assurance RAL-GZ 041, 2016, pp. 1-8.
Linxing Yao et al. "Textural and Physical Properties of Biorenewable 'Waxes' Containing Partial Acylglycerides". Journal of the American Oil Chemists' Society, 2011, vol. 89, No. 1, pp. 155-166.

* cited by examiner

*Primary Examiner* — Ellen M McAvoy
(74) *Attorney, Agent, or Firm* — Oliff PLC

(57) ABSTRACT

A composition for a candle which is characterized in that it includes, in percent by weight: from 0 to 40% of at least one fatty alcohol, from 3 to 10% of at least one volatile alkane whose flash point is less than 180° C. from 0 to 3% of at least one wax, from 0 to 3% of at least one mixture of unsaponifiables, and from 47 to 95% of at least one at least partially hydrogenated vegetable oil.

23 Claims, No Drawings

COMPOSITION FOR CANDLE

The present invention relates to a biobased composition for the manufacture of candles.

Candles have been used for centuries, and their compositions have varied over time.

After tallow candles and beeswax candles, the invention of Michel Eugene Chevreul in 1820 who perfected the method of extracting stearic acid or stearin from fats of animal origin made it possible to replace the tallow candle with the stearic candle.

Then, with the advent of petroleum-based materials and the abandonment of animal sources, stearin was replaced by paraffin of petroleum origin.

Today, developments are oriented toward waxes of vegetable origin, particularly since the work of Michael Richards, who worked in search of an alternative to beeswax in the 1990s, and began to manufacture candles made of "soy wax."

Originally this "soy wax" was made up of mixtures of soybean oil and beeswax, or a mixture of coconut oil, palm oil and soybean oil . . . .

Then, the hydrogenation of liquid oils made it possible to no longer be dependent on concrete oils such as coconut oil (copra) or palm oil and palm kernel oils and to obtain "solid" oils that can be employed in the composition of candles.

In addition to palm oil candles, we have thus witnessed the appearance of candles made of soy wax, rapeseed wax, carnauba wax, etc.

However, all of these candles based on specific vegetable oils and hydrogenated oils have the drawbacks of being fragile, having cracks and surface defects, bubbling at the time of crystallization, and very frequently having problems with combustion and burn, etc.

Various solutions have been specified in the prior art.

In WO2008/115604, it was recommended to add beeswax to a mixture of non-hydrogenated and fully or partially hydrogenated vegetable oil.

In order to resolve the known flow and surface problems of palm oil-based candles, KR101839237 describes compositions comprising palm oil and fatty alcohols.

In US2003/0046860, additives for resolving the problems posed by fats of vegetable origin are additives that are capable of influencing crystallization, such as fatty acid esters, fatty acids, or other hydrogenated or non-hydrogenated concrete oils such as palm or coconut oils. Also, the use of palm oil must be limited or even eliminated because of the ecological problems caused by the cultivation of oil palms.

US2010/0212214 discloses (biobased) renewable wax candle compositions. The composition of these candles includes a fatty alcohol and, according to another embodiment, can include a fatty alcohol and a "vegetable-based wax". In addition to the fact that the compositions described are free of alkanes, the various examples presented in the application all include ingredients derived from palm oil. Indeed, the fatty alcohols are derived from palmitic fatty acids, and the majority of the compositions comprise palm "waxes," which are not clearly defined. The appearances of certain compositions described seem to constitute counter-examples such as the "greasy and semi-transparent" appearance, for instance, which cannot be the desired appearance.

The present invention makes it possible to resolve all of the problems mentioned above, particularly the problems both with combustion and the appearance of fragility, and enables candles to be obtained which comprise only completely biobased ingredients and are free of palm oil while performing at least equally well as those obtained with waxes of mineral or animal origin and satisfying the standards EN15426, RAL GZ-041 EU Reach, and ASTM title 16.

The present invention relates to a candle composition which comprises, in percent by weight:

- from 0 to 40% of at least one fatty alcohol,
- from 3 to 10% of at least one volatile alkane whose flash point is less than 180° C.,
- from 0 to 3% of at least one wax,
- from 0 to 3% of at least one mixture of unsaponifiables,
- from 47 to 95% of at least one at least partially hydrogenated vegetable oil.

The present invention also relates to a composition for a candle which comprises, in percent by weight:

- from 20 to 40% of at least one fatty alcohol,
- from 3 to 10% of at least one volatile alkane whose flash point is less than 100° C.,
- from 0 to 3% of at least one wax,
- from 0 to 3% of at least one mixture of unsaponifiables,
- from 47 to 77% of at least one at least partially hydrogenated vegetable oil.

In one embodiment, the composition according to the invention is characterized in that it is free of palm oil.

In one embodiment, the composition according to the invention is characterized in that the at least one fatty alcohol has a carbon number greater than or equal to 16.

In one embodiment, the composition according to the invention is characterized in that it is free of palm oil and in that the at least one fatty alcohol has a carbon number greater than or equal to 16.

In one embodiment, the composition according to the invention is characterized in that it is free of fatty alcohol.

In one embodiment, the composition according to the invention is characterized in that it is free of palm oil and fatty alcohol.

In one embodiment, the composition according to the invention is characterized in that its melting point is between 45 and 55° C.

In one embodiment, the composition according to the invention is characterized in that its melting point is between 46 and 52° C.

In one embodiment, the composition according to the invention is characterized in that it additionally comprises from 0 to 60% of at least one non-hydrogenated vegetable oil.

In one embodiment, the composition according to the invention is characterized in that it additionally comprises from 0 to 60% of at least one fully hydrogenated vegetable oil.

In one embodiment, the composition according to the invention is characterized in that it comprises a mixture of vegetable oils of which at least one is at least partially hydrogenated and at least the other is not hydrogenated.

In one embodiment, the composition according to the invention is characterized in that it comprises a mixture of vegetable oils of which at least one is fully hydrogenated and at least the other is not hydrogenated.

In one embodiment, the composition according to the invention is characterized in that the at least one fatty alcohol, the at least one volatile alkane, and the at least one vegetable oil are biobased.

In one embodiment, the composition according to the invention is characterized in that the at least one volatile alkane and the at least one vegetable oil are biobased.

A "fatty alcohol" is an alcohol with a long carbon chain, most of which possess an even number of carbon atoms and comprise from 8 to 36 carbon atoms.

In the present application, an "alkane" is a saturated hydrocarbon consisting solely of carbon and hydrogen atoms linked together by single covalent bonds whose general formula is $C_nH_{2n+2}$, it is referred to as a "linear alkane" if each carbon atom is bonded to no more than two carbon atoms and as a "branched alkane" if certain carbon atoms are bonded to three or even four carbon atoms.

Within the meaning of the present invention, the term "liquid oil of vegetable origin": a fraction that is insoluble in water, is extracted from a part of a plant (seeds, fruits, etc.), and contains primarily triglycerides of fatty acids.

Triglycerides, also called triacylglycerols, triacylglycerides, or fatty acid triglycerides, are glycerides in which the three hydroxyl groups of glycerol are esterified with fatty acids. They are the main constituents of vegetable oil.

Within the meaning of the present application, "vegetable wax" is understood to mean a composition that comprises at least one partially or fully hydrogenated oil. These vegetable waxes can comprise fatty acid and fatty alcohol esters and can also comprise fatty acids, free fatty alcohols, long-chain linear alkanes, and/or unsaponifiables.

In the present application, an "unsaponifiable" or "unsaponifiable matter" means any organic matter that makes up oils or fatty substances in general and cannot be saponified or extracted from vegetable oils by molecular distillation in the presence of triglycerides.

Thus, more specifically, unsaponifiable matter comprises natural constituents of fats such as sterols, phytosterols, hydrocarbons, and higher alcohols: aliphatics and terpenes.

In the present application, a "percent by weight" is the ratio of the mass of a first compound relative to the total mass of a mixture of compounds (including the first compound) or composition, expressed as a percentage.

In the present application, a compound or an organic composition is considered to be "biobased" if the organic carbon that is present in the compound or composition is of vegetable origin based on a radiocarbon analysis according to one of the following standards: ASTM D6866, EN 16640, or EN 16785-1.

In one embodiment, the composition according to the invention is characterized in that the fatty alcohol is selected from the group consisting of fatty alcohols comprising from 16 to 24 carbon atoms, alone or in mixtures.

In one embodiment, the composition according to the invention is characterized in that the fatty alcohol is selected from the group consisting of fatty alcohols comprising from 18 to 24 carbon atoms, alone or in mixtures.

In one embodiment, the composition according to the invention is characterized in that the fatty alcohol is selected from the group consisting of fatty alcohols comprising from 18 to 22 carbon atoms, alone or in mixtures.

In one embodiment, the composition according to the invention is characterized in that the fatty alcohol is selected from the group comprising octadecanol, eicosanol, docosanol, and tetracosanol, alone or in mixtures.

In one embodiment, the composition according to the invention is characterized in that the fatty alcohol is selected from the group comprising octadecanol and docosanol, alone or in mixtures.

In one embodiment, the composition according to the invention is characterized in that the volatile alkane whose flash point is less than 180° C. is selected from the group comprising bioalkanes with 10 to 24 linear and/or branched carbon atoms, alone or in a mixture.

In one embodiment, the composition according to the invention is characterized in that the volatile alkane whose flash point is less than 150° C. is selected from the group comprising bioalkanes with 10 to 24 linear and/or branched carbon atoms, alone or in a mixture.

In one embodiment, the composition according to the invention is characterized in that the volatile alkane whose flash point is less than 120° C. is selected from the group comprising bioalkanes with 10 to 24 linear and/or branched carbon atoms, alone or in a mixture.

In one embodiment, the composition according to the invention is characterized in that the volatile alkane whose flash point is less than 100° C. is selected from the group comprising bioalkanes with 10 to 24 linear and/or branched carbon atoms, alone or in a mixture.

In one embodiment, the composition according to the invention is characterized in that the volatile alkane whose flash point is less than 180° C. is selected from the group comprising bioalkanes with 12 to 18 linear and/or branched carbon atoms, alone or in a mixture.

In one embodiment, the composition according to the invention is characterized in that the volatile alkane whose flash point is less than 150° C. is selected from the group comprising bioalkanes with 12 to 18 linear and/or branched carbon atoms, alone or in a mixture.

In one embodiment, the composition according to the invention is characterized in that the volatile alkane whose flash point is less than 120° C. is selected from the group comprising bioalkanes with 12 to 18 linear and/or branched carbon atoms, alone or in a mixture.

In one embodiment, the composition according to the invention is characterized in that the volatile alkane whose flash point is less than 100° C. is selected from the group comprising bioalkanes with 12 to 18 linear and/or branched carbon atoms, alone or in a mixture.

In one embodiment, the composition according to the invention is characterized in that the volatile alkane whose flash point is less than 180° C. is selected from the group comprising dodecane, tetradecane, hexadecane, octadecane, and eicosane, alone or in a mixture.

In one embodiment, the composition according to the invention is characterized in that the volatile alkane whose flash point is less than 150° C. is selected from the group comprising dodecane, tetradecane, hexadecane, octadecane, and eicosane, alone or in a mixture.

In one embodiment, the composition according to the invention is characterized in that the volatile alkane whose flash point is less than 120° C. is selected from the group comprising dodecane, tetradecane, hexadecane, octadecane, and eicosane, alone or in a mixture.

In one embodiment, the composition according to the invention is characterized in that the volatile alkane whose flash point is less than 100° C. is selected from the group comprising dodecane, tetradecane, hexadecane, octadecane, and eicosane, alone or in a mixture.

In one embodiment, the composition according to the invention is characterized in that the volatile alkane whose flash point is less than 180° C. is selected from the group comprising dodecane and octadecane, alone or in a mixture.

In one embodiment, the composition according to the invention is characterized in that the volatile alkane whose flash point is less than 150° C. is selected from the group comprising dodecane and octadecane, alone or in a mixture.

In one embodiment, the composition according to the invention is characterized in that the volatile alkane whose flash point is less than 120° C. is selected from the group comprising dodecane and octadecane, alone or in a mixture.

In one embodiment, the composition according to the invention is characterized in that the volatile alkane whose flash point is less than 100° C. is selected from the group comprising dodecane and octadecane, alone or in a mixture.

In one embodiment, the composition according to the invention is characterized in that the partially hydrogenated vegetable oil or the mixture comprising at least one non-hydrogenated oil and at least one at least partially hydrogenated oil is selected from the group comprising vegetable oils with a melting point between 45 and 60° C.

In one embodiment, the composition according to the invention is characterized in that the partially hydrogenated vegetable oil or the mixture comprising at least one non-hydrogenated oil and at least one at least partially hydrogenated oil is selected from the group comprising vegetable oils with a melting point between 45 and 55° C.

In one embodiment, the composition according to the invention is characterized in that the partially hydrogenated vegetable oil is selected from the group comprising partially hydrogenated soybean oil, partially hydrogenated rapeseed oil, sunflower oil partially hydrogenated grapeseed oil, partially hydrogenated corn oil, partially hydrogenated olive oil, partially hydrogenated cottonseed oil, partially hydrogenated coconut oil, partially hydrogenated jojoba oil, and mixtures thereof.

In one embodiment, the composition according to the invention is characterized in that the at least one wax is selected from the group consisting of vegetable or synthetic waxes.

In one embodiment, the composition according to the invention is characterized in that the at least one wax is selected from the group comprising waxes having a melting point of between 45 and 90° C.

In one embodiment, the composition according to the invention is characterized in that the at least one wax is selected from the group comprising waxes having a melting point of between 60 and 90° C.

In one embodiment, the composition according to the invention is characterized in that the at least one wax is selected from the group comprising waxes having a melting point of between 45 and 65° C.

In one embodiment, the composition according to the invention is characterized in that the vegetable wax is selected from the group comprising carnauba wax, sunflower wax, mimosa wax, rice wax, candelilla, jojoba wax, castor wax, and olive wax.

In one embodiment, the composition according to the invention is characterized in that the synthetic wax is selected from the group comprising paraffin, polyethylene wax, and microcrystalline wax.

In one embodiment, the composition according to the invention is characterized in that the mixture of unsaponifiables is selected from the group comprising unsaponifiables of sunflower oil, castor oil, and olive oil.

In one embodiment, the composition according to the invention is characterized in that the mixture of unsaponifiables is selected from the group comprising unsaponifiables of vegetable waxes.

In one embodiment, the composition according to the invention is characterized in that the mixture of unsaponifiables is selected from the group comprising sterols, phytosterols, tocopherols, hydrocarbons, higher alcohols: aliphatics and terpenes and derivatives thereof.

In one embodiment, the composition according to the invention is characterized in that the mixture of unsaponifiables comprises tocopherol and/or derivatives thereof having antioxidant properties.

In one embodiment, the composition according to the invention is characterized in that it is free of synthetic antioxidants.

EXAMPLES OF FORMULATIONS

Example 1

TABLE 1

After cooling, the composition obtained by mixing at 60° C. has a melting point of 47° C..

| CONSTITUENTS | PRODUCTS | PERCENTAGES BY WEIGHT (%) |
|---|---|---|
| FATTY ALCOHOL | ALCOHOL 16/18 | 33 |
| VOLATILE ALCANE | COCONUT ALCANE 12/18 | 7 |
| WAX | SUNFLOWER WAX (KALHWAX 6607L) | 2 |
| PARTIALLY HYDROGENATED VEGETABLE OIL | SOYA HYDRO 50 (ADM) | 58 |

The fashioned candles are satisfactory in terms of strength, appearance, surface, and combustion.

Example 2

TABLE 2 after cooling, The composition obtained by mixing at 60° C. has a melting point of 49° C..

| CONSTITUENTS | PRODUCTS | PERCENTAGES BY WEIGHT (%) |
|---|---|---|
| FATTY ALCOHOL | RAPESEED ALCOHOL 18/22 | 33 |
| VOLATILE ALCANE | COCONUT ALCANE 12/18 | 5 |
| WAX/ UNSAPONIFIABLES | HYDROGENATED OLIVE WAX | 5 |
| PARTIALLY HYDROGENATED VEGETABLE OIL | RAPESEED HYDRO 52 (CARGILL) | 57 |

The fashioned candles are satisfactory in terms of strength, appearance, surface, and combustion.

Example 3

TABLE 3

Comparison of different compositions

| No. | CONSTITUENTS | PRODUCTS | PERCENTAGES BY WEIGHT (%) | Weight reduction after 60 min (g) | Flame size (cm) | Melt pool size (cm) | COMMENTS |
|---|---|---|---|---|---|---|---|
| 1 | PARTIALLY HYDROGENATED VEGETABLE OIL | NatureWax C3/ Cargill | 100 | 5 | 1.8 | 4.6 | Deep crater with random white crystals |

TABLE 3-continued

Comparison of different compositions

| No. | CONSTITUENTS | PRODUCTS | PERCENTAGES BY WEIGHT (%) | Weight reduction after 60 min (g) | Flame size (cm) | Melt pool size (cm) | COMMENTS |
|---|---|---|---|---|---|---|---|
| 2 | PARTIALLY HYDROGENATED VEGETABLE OIL | NatureWax C3/ Cargill | 97 | 5 | 1.8 | 4 | Small melt pool Low flame |
| | UNSAPONIFIABLE | Hydrogenated unsapofiable (olive wax) | 3 | | | | |
| 3 | PARTIALLY HYDROGENATED VEGETABLE OIL | NatureWax C3/ Cargill | 80 | 4.5 | 2 | 4 | Small melt pool Low diffusion |
| | FATTY ALCOHOL | Fatty alcohols C1822 (rapeseed) | 20 | | | | |
| 4 | PARTIALLY HYDROGENATED VEGETABLE OIL | NatureWax C3/ Cargill | 75 | 5 | 2.5 | 5 | Nice-looking melt pool |
| | ALCANE | Dodecane | 5 | | | | |
| | FATTY ALCOHOL | Fatty alcohols C1822 (rapeseed) | 20 | | | | Nice-looking flame |
| 5 | PARTIALLY HYDROGENATED VEGETABLE OIL | NatureWax C3/ Cargill | 72 | 4.8 | 2.6 | 5 | Nice-looking melt pool |
| | WAX | Sunwax (melting point 78° C.) | 3 | | | | Acceptable diffusion |
| | ALCANE | Alkane 1618 (2.5% hexadecane + 2.5% octadecane) | 5 | | | | |
| | FATTY ALCOHOL | Fatty alcohols C1822 (Rapeseed) | 20 | | | | |
| 6 | PARTIALLY HYDROGENATED VEGETABLE OIL | NatureWax C3/ Cargill | 62 | 5.5 | 2.6 | 5 | Nice-looking melt pool |
| | UNSAPONIFIABLE | Hydrogenated unsapofiable (olive wax) | 3 | | | | Good diffusion |
| | ALCANE | Dodecane | 5 | | | | |
| | FATTY ALCOHOL | Fatty alcohols C1822 (Rapeseed) | 30 | | | | |
| 7 | PARTIALLY HYDROGENATED VEGETABLE OIL | NatureWax C3/ Cargill | 92 | 6 | 2.8 | 5.5 | Nice-looking melting pot Acceptable diffusion |
| | WAX | Sunflower wax | 3 | | | | |
| | ALCANE | +1% decane + 4% dodecane | 5 | | | | |
| 8 | PARTIALLY HYDROGENATED VEGETABLE OIL | NatureWax C3/ Cargill | 92 | 6 | 3 | 5.5 | Nice-looking melt pool Acceptable diffusion |
| | WAX | +3% candelilla wax | 3 | | | | |
| | ALCANE | +1% decane + 4% dodecane | 5 | | | | |

The various tests listed in the table below are compositions of candles that were fashioned at a filling temperature of 70-80° C. in 290 g glass vessels measuring 8.3 cm in diameter; the wicks used were Wedo LX 22 wicks.

Test 1 is a candle consisting solely of partially hydrogenated vegetable oil marketed under the name NatureWaxC3. As indicated in the table above, the combustion is not good, and the candle has a deep crater with numerous crystals.

This candle is unsatisfactory both in terms of appearance and combustion.

Test 2 is a candle consisting of partially hydrogenated vegetable oil marketed under the name NatureWaxC3 and unsaponifiables in the form of olive wax. As indicated in the table above, the combustion is not good, and the candle has a small melt pool.

This candle is unsatisfactory both in terms of appearance and combustion.

Test 3 is a candle consisting of partially hydrogenated vegetable oil marketed under the name NatureWaxC3, and fatty alcohol. As indicated in the table above, the combustion is not good, and the candle has a small melt pool.

This candle is unsatisfactory both in terms of appearance and combustion.

Test 4 is a candle consisting of partially hydrogenated vegetable oil marketed under the name NatureWaxC3, dodecane, and fatty alcohols. As shown in the table above, the combustion is good and the melt pool meets commercial requirements.

This candle is satisfactory both in terms of appearance and combustion.

Test 5 is a candle consisting of partially hydrogenated vegetable oil marketed under the name NatureWaxC3, sunflower wax, a mixture of alkanes and fatty alcohols. As shown in the table above, the combustion is correct and the melt pool meets commercial requirements.

This candle is satisfactory both in terms of its appearance and combustion even though the flame has a lower diffusion than that of example 4.

Test 6 is a candle consisting of partially hydrogenated vegetable oil marketed under the name NatureWaxC3, unsaponifiables in the form of olive wax, dodecane, and fatty alcohols. As shown in the table above, the combustion is good and the melt pool meets commercial requirements.

This candle is satisfactory both in terms of appearance and combustion.

Test 7 is a candle consisting of partially hydrogenated vegetable oil marketed under the name NatureWaxC3, sunflower wax, a mixture of alkanes consisting of dodecane and decane. As shown in the table above, the combustion is good and the melt pool meets commercial requirements.

This candle is satisfactory both in terms of appearance and combustion.

Test 8 is a candle consisting of partially hydrogenated vegetable oil marketed under the name NatureWaxC3, candelilla wax, a mixture of alkanes consisting of dodecane and decane. As shown in the table above, the combustion is good and the melt pool meets commercial requirements.

This candle is satisfactory both in terms of appearance and combustion.

The invention claimed is:

1. A composition for candle, wherein it comprises, in percent by weight:

from 0 to 40% of at least one fatty alcohol, from 3 to 10% of at least one volatile alkane whose flash point is less than 180° C., from 0 to 3% of at least one wax, from 0 to 3% of at least one mixture of unsaponifiables, from 47 to 95% of at least one at least partially hydrogenated vegetable oil.

2. The composition as set forth in claim 1, wherein it comprises, in percent by weight:

from 20 to 40% of at least one fatty alcohol, from 3 to 10% of at least one volatile alkane whose flash point is less than 100° C., from 0 to 3% of at least one wax, from 0 to 3% of at least one mixture of unsaponifiables, from 47 to 77% of at least one partially hydrogenated vegetable oil.

3. The composition as set forth in claim 1, wherein the composition for candle is free of palm oil.

4. The composition as set forth in claim 1, wherein the fatty alcohol is selected from the group consisting of fatty alcohols comprising from 18 to 24 carbon atoms, alone or in mixtures.

5. The composition as set forth in claim 1, wherein the fatty alcohol is selected from the group comprising octadecanol, eicosanol, docosanol, and tetracosanol, alone or in mixtures.

6. The composition as set forth in claim 1, wherein the fatty alcohol is selected from the group comprising octadecanol and docosanol, alone or in mixtures.

7. The composition as set forth in claim 1, wherein the volatile alkane whose flash point is lower than 180° C. is selected from the group comprising bioalkanes with 10 to 24 linear and/or branched carbon atoms, alone or in a mixture.

8. The composition as set forth in claim 1, wherein the volatile alkane whose flash point is lower than 180° C. is selected from the group comprising bioalkanes from 12 to 18 linear and/or branched carbon atoms, alone or in a mixture.

9. The composition as set forth in claim 1, wherein the volatile alkane whose flash point is lower than 180° C. is selected from the group comprising dodecane, tetradecane, hexadecane, octadecane, eicosane, alone or in a mixture.

10. The composition as set forth in claim 1, wherein the volatile alkane whose flash point is lower than 180° C. is selected from the group comprising dodecane and octadecane, alone or in a mixture.

11. The composition as set forth in claim 1, wherein the partially hydrogenated vegetable oil is selected from the group of vegetable oils having a melting point of between 45 and 60° C.

12. The composition as set forth in claim 1, wherein the partially hydrogenated vegetable oil is selected from the group comprising partially hydrogenated soybean oil, partially hydrogenated rapeseed oil, partially hydrogenated sunflower oil, partially hydrogenated grapeseed oil, partially hydrogenated corn oil, partially hydrogenated olive oil, partially hydrogenated cottonseed oil, partially hydrogenated coconut oil, partially hydrogenated jojoba oil, and mixtures thereof.

13. The composition as set forth in claim 1, wherein the at least one wax is selected from the group consisting of vegetable or synthetic waxes.

14. The composition as set forth in claim 1, wherein the at least one wax is selected from the group comprising waxes having a melting point of between 45 and 90° C.

15. The composition as set forth in claim 1, wherein the at least one wax is selected from the group comprising waxes having a melting point of between 60 and 90° C.

16. The composition as set forth in claim 1, wherein the at least one wax is selected from the group comprising waxes having a melting point of between 45 and 65° C.

17. The composition as set forth in claim 1, wherein the vegetable wax is selected from the group comprising carnauba wax, sunflower wax, mimosa wax, rice wax, candelilla wax, jojoba wax, castor wax, and olive wax.

18. The composition as set forth in claim 1, wherein the synthetic wax is selected from the group comprising paraffin, polyethylene wax, and microcrystalline wax.

19. The composition as set forth in claim 1, wherein the at least one mixture of unsaponifiables is selected from the group comprising unsaponifiables of sunflower oil, castor oil, and olive oil.

20. The composition as set forth in claim 1, wherein the mixture of unsaponifiables is selected from the group comprising unsaponifiables of vegetable waxes.

21. The composition as set forth in claim 1, wherein the mixture of unsaponifiables is selected from the group comprising sterols, phytosterols, tocopherols, higher aliphatic and/or terpene alcohols, and derivatives thereof.

22. The composition as set forth in claim 1, wherein the mixture of unsaponifiables comprises tocopherol and/or derivatives thereof having antioxidant properties.

23. The composition as set forth in claim 1, wherein it is free of synthetic antioxidants.

* * * * *